United States Patent
Kim et al.

(10) Patent No.: US 10,576,875 B2
(45) Date of Patent: Mar. 3, 2020

(54) ANTI-GLARE TYPE VEHICLE ROAD SIGNBOARD AND ROAD LANE IDENTIFICATION DEVICE

(71) Applicants: Sug Bae Kim, Daegu (KR); Jin Soo Nam, Daegu (KR); Hong Ki Ha, Daegu (KR); Sun Mi Kim, Daegu (KR); Jong Ho Kim, Daegu (KR)

(72) Inventors: Sug Bae Kim, Daegu (KR); Jin Soo Nam, Daegu (KR); Hong Ki Ha, Daegu (KR); Sun Mi Kim, Daegu (KR); Jong Ho Kim, Daegu (KR)

( * ) Notice: Subject to any disclaimer, the term of this patent is extended or adjusted under 35 U.S.C. 154(b) by 0 days.

(21) Appl. No.: 15/756,310

(22) PCT Filed: Aug. 18, 2016

(86) PCT No.: PCT/KR2016/009059
§ 371 (c)(1),
(2) Date: Feb. 28, 2018

(87) PCT Pub. No.: WO2017/039192
PCT Pub. Date: Mar. 9, 2017

(65) Prior Publication Data
US 2018/0244193 A1  Aug. 30, 2018

(30) Foreign Application Priority Data
Sep. 2, 2015  (KR) .................. 10-2015-0124388

(51) Int. Cl.
*B60Q 1/16* (2006.01)
*B60Q 1/24* (2006.01)
(Continued)

(52) U.S. Cl.
CPC ............ *B60Q 1/16* (2013.01); *B60Q 1/02* (2013.01); *B60Q 1/24* (2013.01); *F21S 2/00* (2013.01);
(Continued)

(58) Field of Classification Search
None
See application file for complete search history.

(56) References Cited

U.S. PATENT DOCUMENTS

2006/0017656 A1*  1/2006  Miyahara ............... B60R 1/00
                                                     345/8
2012/0044090 A1*  2/2012  Kahler .................. B60Q 1/50
                                                     340/905
(Continued)

FOREIGN PATENT DOCUMENTS

DE   102014000935        7/2015
DE   102014000935 A1 *   7/2015  ............ B60Q 1/143
(Continued)

OTHER PUBLICATIONS

International Search Report dated Nov. 28, 2016 for PCT/KR2016/009059.
(Continued)

*Primary Examiner* — Sath V Perungavoor
*Assistant Examiner* — Tyler B Edwards
(74) *Attorney, Agent, or Firm* — Schmeiser, Olsen & Watts, LLP

(57) ABSTRACT

An anti-glare type vehicle road signboard and a road lane identification device is provided. The anti-glare type vehicle road signboard and road lane identification device includes: a light-irradiating unit provided in a vehicle for irradiating a non-visible light beam to the front of the vehicle while traveling; an image photographing unit for photographing an image reflected onto the road signboard and the road lane from the light irradiated by the light irradiating unit; and a shape projecting unit for transmitting an image signal photographed by the image photographing unit while traveling and projecting a high luminance light in a state wherein the shapes of the road lane and the road signboard overlap each
(Continued)

other to thereby have the road signboard and the road lane clearly seen.

6 Claims, 6 Drawing Sheets

(51) Int. Cl.
*H04N 5/33* (2006.01)
*G06K 9/00* (2006.01)
*H04N 5/217* (2011.01)
*B60Q 1/02* (2006.01)
*F21S 2/00* (2016.01)
*H04N 5/225* (2006.01)
*H04N 9/31* (2006.01)

(52) U.S. Cl.
CPC ..... *G06K 9/00798* (2013.01); *G06K 9/00818* (2013.01); *H04N 5/217* (2013.01); *H04N 5/2256* (2013.01); *H04N 5/33* (2013.01); *B60Q 2300/056* (2013.01); *B60Q 2300/42* (2013.01); *H04N 9/3176* (2013.01)

(56) References Cited

U.S. PATENT DOCUMENTS

| | | | | |
|---|---|---|---|---|
| 2013/0257274 | A1* | 10/2013 | Sekiguchi | B60Q 1/143 |
| | | | | 315/82 |
| 2014/0028873 | A1* | 1/2014 | Higuchi | G06K 9/2054 |
| | | | | 348/229.1 |
| 2014/0218268 | A1* | 8/2014 | Olesen | B60R 1/00 |
| | | | | 345/7 |
| 2014/0267415 | A1* | 9/2014 | Tang | G06T 11/60 |
| | | | | 345/633 |

FOREIGN PATENT DOCUMENTS

| | | |
|---|---|---|
| JP | 2008252327 A | 10/2008 |
| JP | 2010-173544 A | 8/2010 |
| KR | 20050001986 A | 1/2005 |
| KR | 10-1409340 B1 | 6/2014 |
| KR | 10-2015-0017511 A | 2/2015 |
| KR | 10-2015-0020839 A | 2/2015 |

OTHER PUBLICATIONS

European Extended Search Report dated Jun. 20, 2018, Application No. 16842158.4 (PCT/KR2016/009059).
Canadian Office Action dated Jan. 9, 2019 for Application No. 2,997,396.

* cited by examiner

ANTI-GLARE TYPE VEHICLE ROAD SIGNBOARD AND ROAD LANE IDENTIFICATION DEVICE

CROSS-REFERENCE TO RELATED APPLICATIONS

This application claims priority to PCT Application No. PCT/KR2016/009059, having a filing date of Aug. 18, 2016, based on KR 10-2015-0124388, having a filing date of Sep. 2, 2015, the entire contents both of which are hereby incorporated by reference.

FIELD OF TECHNOLOGY

The following relates to an anti-glare type vehicle road signboard and road lane identification device, and more particularly, to an anti-glare type vehicle road signboard and road lane identification device in which, by irradiating a light irradiation unit with a non-visible light beam such as an infrared ray or the like such that an image signal obtained in an image capturing unit by capturing reflected light selectively reflected by retro-reflective materials contained in a road signboard and a road lane is projected by a figure projection unit, when a vehicle moves forward, left, and right and oscillates up and down, the image capturing unit and the figure projection unit are synchronized with respect to movement of the road signboard and the road lane, the movement of the road signboard and the road lane is traced, and high luminance light is projected by the figure projection unit in a state in which figures of the road signboard and the road lane overlap each other, and thus glare to a driver of a vehicle traveling in an opposite road lane is prevented and a driver can be assisted with safe driving by being able to clearly recognize the road signboard and the road lane.

BACKGROUND

Generally, road signboards refer to traffic information installations which are provided on sidewalks, edges of roads, or the like, display traveling directions and guidance of vehicles using various types of characters, symbols, figures, etc. according to the purpose of use, and provide road or region guidance to drivers or pedestrians.

Since such road signboards are at a specific height from the ground, road signboards may be identifiable by reflecting light only when there are light sources such as vehicle headlamps.

Meanwhile, road signboards use various lighting devices which illuminate, from the inside or outside, a signboard which is painted with a luminous material for easy identification even at night or a signboard using various light sources such as incandescent lamps, light-emitting diode (LED) lamps, etc.

Further, a road lane (a traffic lane) is a guide lane which guides the travel of a moving vehicle, and serves to guide the travel of a moving vehicle and prevent the moving vehicle from colliding with a vehicle in a neighboring lane.

However, because road signs are poorly visible to the driver unless the high beams of the headlamps are turned on, and because light does not reach the road signboard and the road lane on a cloudy day or a foggy day even when the high beams are turned on, the driver may not recognize guidance text and the road lane.

In other words, conventionally, when driving a vehicle in the city and an irradiation distance of a headlamp is no greater than 30 m, an irradiation angle of the headlamp is out of a range in which the headlamp may illuminate a road signboard, and thus there is a problem in that the driver passes a destination because the driver may not identify the road signboard, or a serious accident is caused due to slowing down in order to identify the road signboard.

On the other hand, conventionally, when the high beams are turned on to identify the road signboard and an oncoming vehicle approaches, the high beams are urgently required to be switched to lower setting, and thus there is a problem in that the vehicle passes the road signboard such that the driver may not identify the road signboard, or when the timing of switching from a higher setting to a lower setting is missed, a driver of the oncoming vehicle receives glare such that a serious accident is caused.

Further, conventionally, when the road signboard is used for a long time in the road lane, the paint of the road signboard is gradually separated and the driver may not identify the road signboard, and thus there is a problem in that the vehicle collides with a vehicle traveling in a neighboring lane.

Therefore, there is a need to address these problems.

SUMMARY

An aspect relates to an anti-glare type vehicle road signboard and road lane identification device in which, by irradiating a light irradiation unit with a non-visible light beam such as an infrared ray or the like such that an image signal obtained in an image capturing unit by capturing reflected light selectively reflected by retroreflective materials contained in a road signboard and a road lane is projected by a figure projection unit, when a vehicle moves forward, left, and right and oscillates up and down, the image capturing unit and the figure projection unit are synchronized with respect to movement of the road signboard and the road lane, the movement of the road signboard and the road lane is traced, and high luminance light is projected by the figure projection unit in a state in which figures of the road signboard and the road lane overlap each other, and thus glare to a driver of a vehicle traveling in an opposite road lane is prevented and a driver can be assisted with safe driving by being able to clearly recognize the road signboard and the road lane.

One aspect of embodiments of the present invention provides an anti-glare type vehicle road signboard and road lane identification device, the device including: a light irradiation unit provided in a vehicle and configured to irradiate a front of the vehicle with a non-visible light beam during traveling; an image capturing unit configured to capture an image which is retroreflected by the road signboard and the road lane due to light applied by the light irradiation unit; and a figure projection unit configured to transmit an image signal captured by the image capturing unit during traveling and project high luminance light in a state in which figures of the road signboard and the road lane overlap each other, such that the road signboard and the road lane are clearly visible.

Further, the light irradiation unit may include a light emitting member configured to apply at least one of an infrared ray, an ultraviolet ray, and an X-ray which is not to be seen by a driver of an oncoming vehicle.

Further, the image capturing unit may include an infrared camera configured to reflect an infrared ray applied from the light irradiation unit and capture the reflected infrared ray.

Further, the figure projection unit may include a light emitting projector configured to transmit and cast the image signal captured by the image capturing unit.

Further, when the vehicle moves forward, left, and right and oscillates up and down, the figure projection unit may synchronize movement of the road signboard and the road lane with a screen angle of the image capturing unit, trace the movement of the road signboard and the road lane, and project high luminance light so that the road signboard and the road lane overlap each other.

Further, the device may further include a figure recognition correction unit configured to correct an image such that the figures of the road signboard and the road lane may be clearly recognized and to transmit the corrected image to the figure projection unit when the figures of the road signboard and the road lane are blurred in the image captured by the image capturing unit.

In an anti-glare type vehicle road signboard and road lane identification device according to embodiments of the present invention, by irradiating a light irradiation unit with a non-visible light beam such as an infrared ray or the like such that an image signal obtained in an image capturing unit by capturing reflected light selectively reflected by retroreflective materials contained in a road signboard and a road lane is projected by a figure projection unit, when a vehicle moves forward, left, and right and oscillates up and down, the image capturing unit and the figure projection unit are synchronized with respect to movement of the road signboard and the road lane, the movement of the road signboard and the road lane is traced, and high luminance light is projected by the figure projection unit in a state in which figures of the road signboard and the road lane overlap each other, and thus glare to a driver of a vehicle traveling in an opposite road lane can be prevented and a driver can be assisted with safe driving by being able to clearly recognize the road signboard and the road lane.

Further, in embodiments of the present invention, when retroreflective materials contained in the road signboard and the road lane are worn and the reflected figures of the road signboard and the road lane are not clear, a figure recognition correction unit can be used for correcting the figures of the road signboard and the road lane so that they are more clearly recognized.

BRIEF DESCRIPTION

Some of the embodiments will be described in detail, with reference to the following figures, wherein like designations denote like members, wherein.

Figure 5:
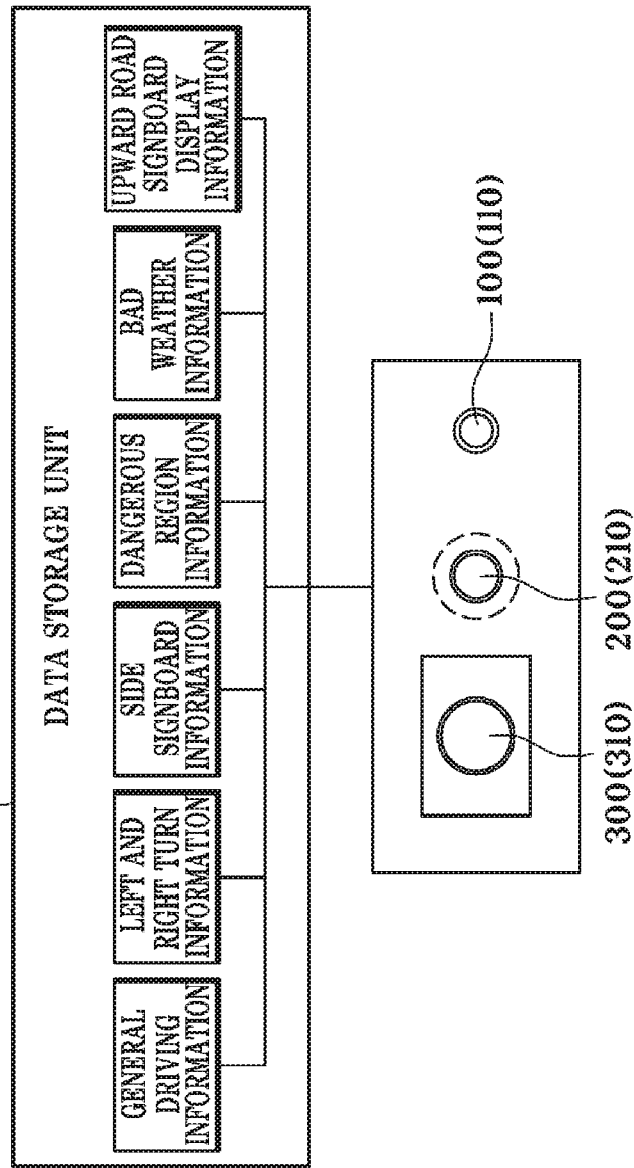
Figure 6:
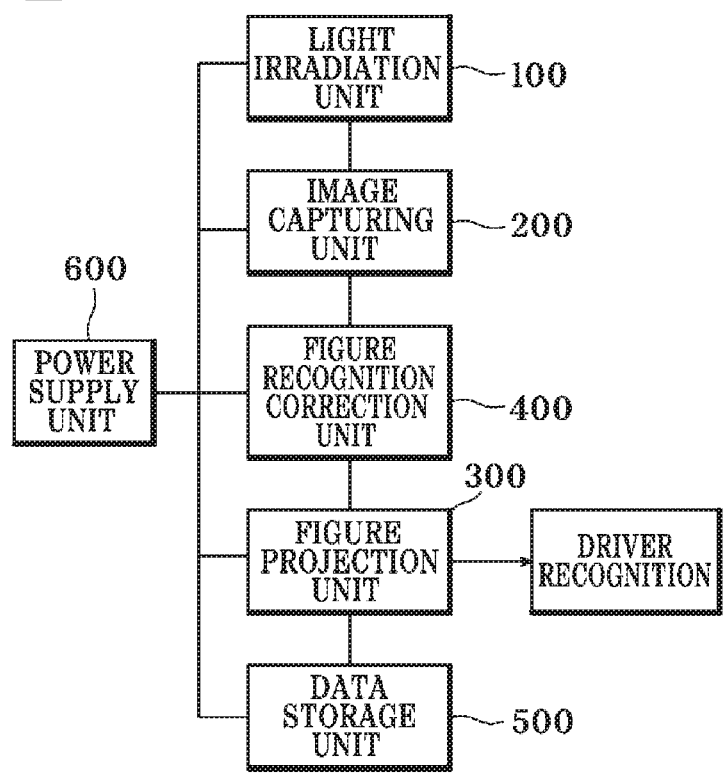

FIG. 5 is a diagram showing a state in which various types of information are stored in a data storage unit of an anti-glare type vehicle road signboard and road lane identification device according to an embodiment of the present invention; and FIG. 6 is a block diagram of an anti-glare type vehicle road signboard and road lane identification device according to an embodiment of the present invention.

DETAILED DESCRIPTION

In this process, thicknesses of lines, sizes of components, or the like shown in the drawings may be exaggerated for clarity and convenience of explanation. Some terms described below are defined by considering functions in embodiments of the invention and meanings may vary depending on, for example, a user or operator's intention or customs. Therefore, the meanings of terms should be interpreted based on the scope throughout this specification.

Figure 1:
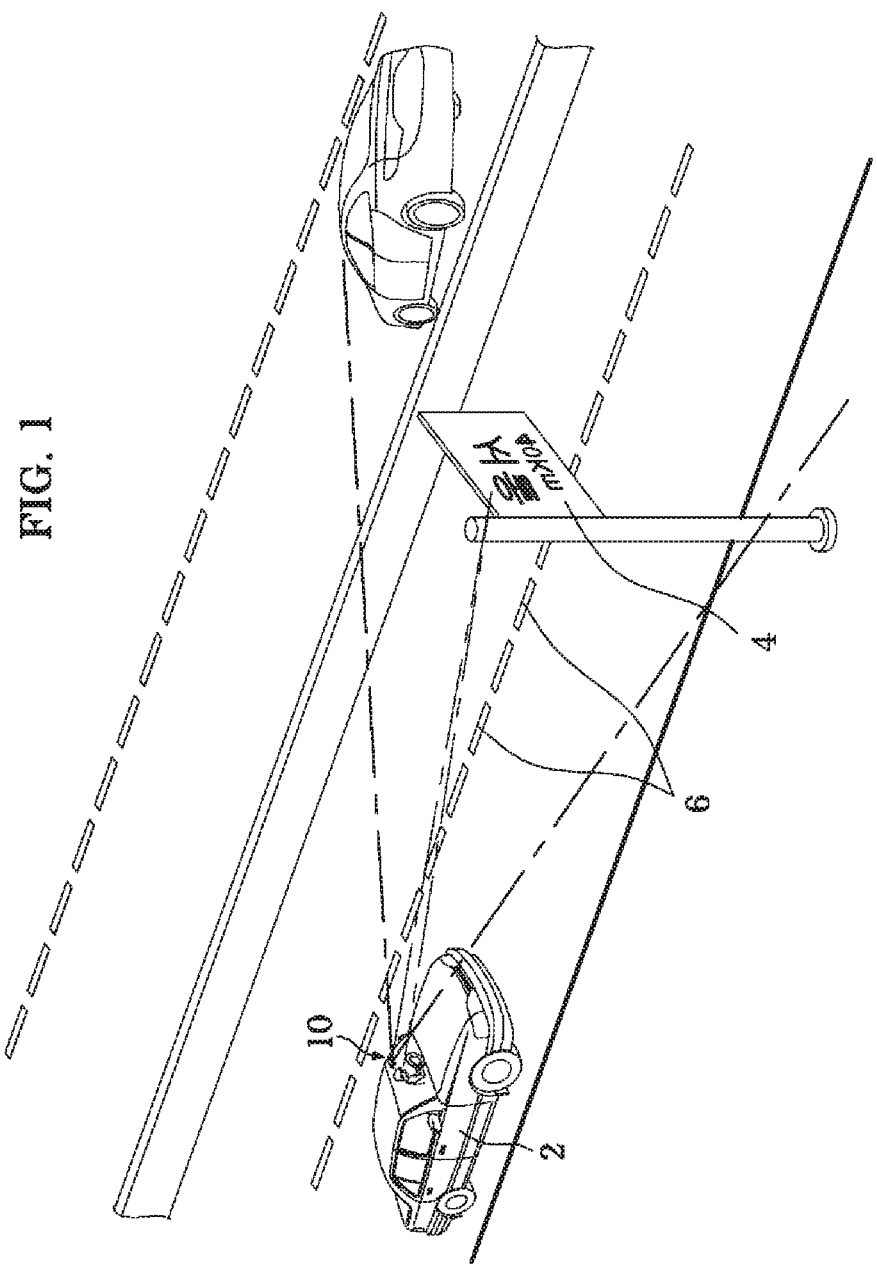
FIG. 1 is a perspective view showing a state in which an anti-glare type vehicle road signboard and road lane identification device according to an embodiment of the present invention is used on a road.
Figure 2:
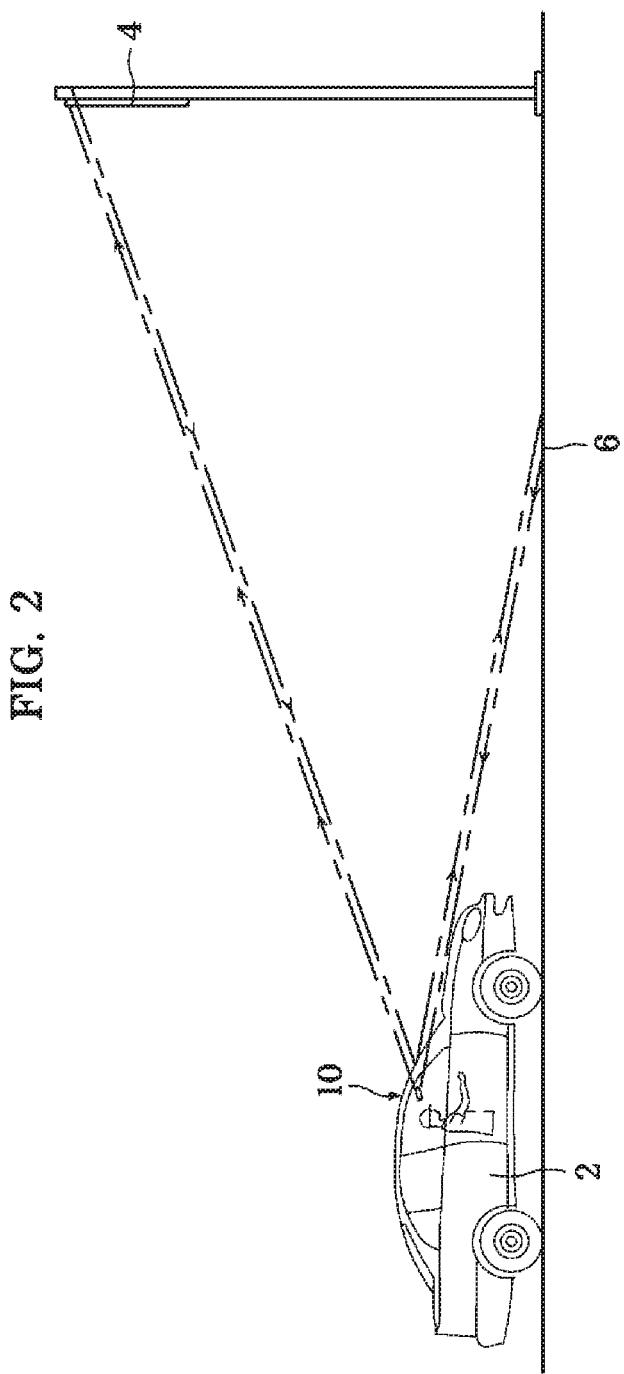
FIG. 2 is a side view showing a state in which an anti-glare type vehicle road signboard and road lane identification device according to an embodiment of the present invention is used on a road.
Figure 3:
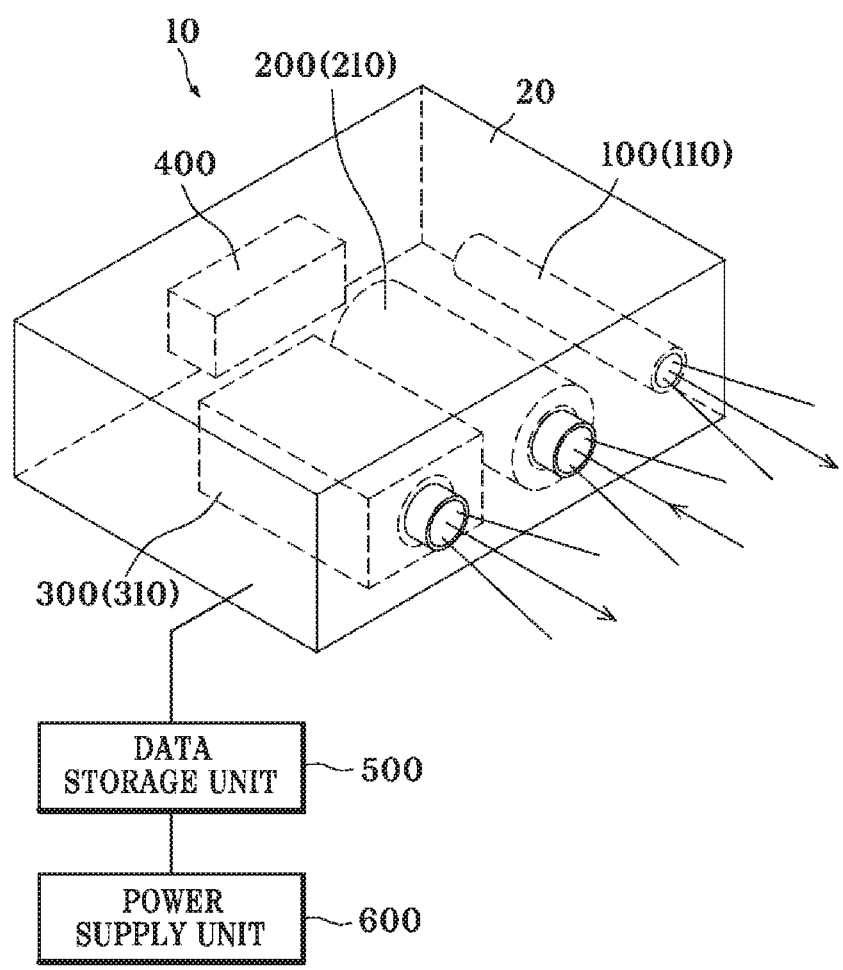
FIG. 3 is a perspective view of an anti-glare type vehicle road signboard and road lane identification device according to an embodiment of the present invention.
Figure 4:
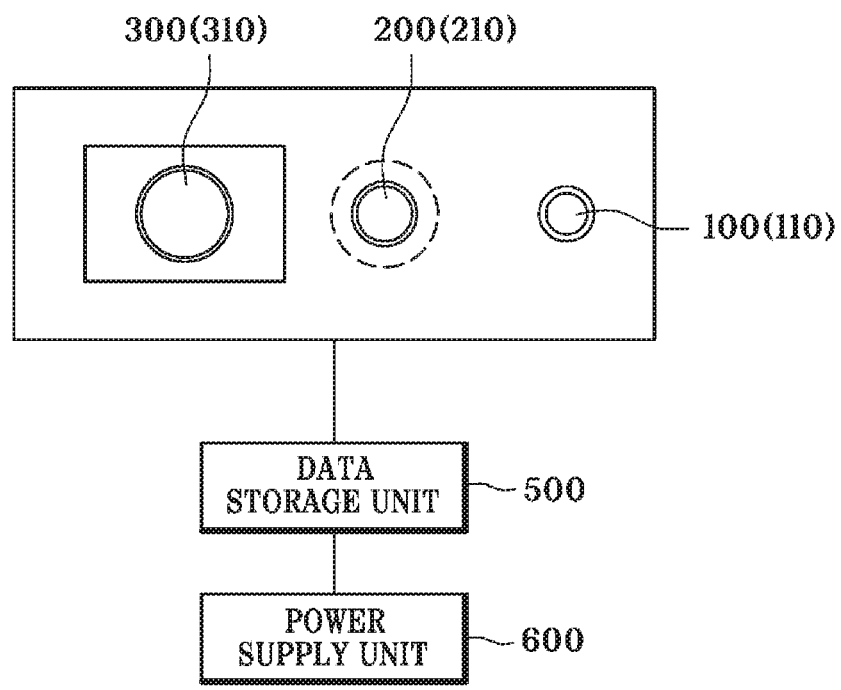
FIG. 4 is a front view of an anti-glare type vehicle road signboard and road lane identification device according to an embodiment of the present invention.

FIG. 1 is a perspective view showing a state in which an anti-glare type vehicle road signboard and road lane identification device according to an embodiment of the present invention is used on a road, FIG. 2 is a side view showing a state in which the anti-glare type vehicle road signboard and road lane identification device according to the embodiment of the present invention is used on a road, FIG. 3 is a perspective view of the anti-glare type vehicle road signboard and road lane identification device according to the embodiment of the present invention, FIG. 4 is a front view of the anti-glare type vehicle road signboard and road lane identification device according to the embodiment of the present invention, FIG. 5 is a diagram showing a state in which various types of information are stored in a data storage unit of the anti-glare type vehicle road signboard and road lane identification device according to the embodiment of the present invention, and FIG. 6 is a block diagram of the anti-glare type vehicle road signboard and road lane identification device according to the embodiment of the present invention.

Referring to FIGS. 1 to 6, an anti-glare type vehicle road signboard and road lane identification device 10 according to the embodiment of the present invention includes a light irradiation unit 100, an image capturing unit 200, and a figure projection unit 300.

A driver of a vehicle traveling on a road may not recognize figures of a road signboard and a road lane using only headlamps at a time when a field of view is not secured, such as night. The anti-glare type vehicle road signboard and road lane identification device 10 according to the embodiment of the present invention is a figure projection system which helps with safe driving by casting high luminance light for reinforcing the figures of the road signboard and the road lane such that the road signboard and the road lane may be seen more clearly, in order to address the above problem.

The light irradiation unit 100 is provided in a vehicle 2 and is configured to irradiate a front of the vehicle 2 with a non-visible light beam during traveling. The light irradiation unit 100 is preferably provided at an upper portion of a front glass of the vehicle 2.

Since the light irradiation unit 100 applies a non-visible light beam that is invisible to a driver's view in an oncoming vehicle, the light irradiation unit 100 may irradiate a road signboard, a median strip, and a road lane with light over a wide range. The non-visible light beam is light having a wavelength in a region that cannot be seen by a person, which excludes visible light, and includes an ultraviolet ray, an infrared ray, an X-ray, and the like.

The light irradiation unit 100 may include a light emitting member 110 which applies at least one of an infrared ray, an ultraviolet ray, and an X-ray so as not to be visible to the driver of the oncoming vehicle.

The light irradiation unit 100 most preferably applies the infrared ray among the non-visible light beams.

The light emitting member 110 is provided inside a case 20 and is formed so as to irradiate the front of the vehicle 2 with the infrared ray.

Although one light emitting member 110 is shown as being provided in the case 20, it may be changed to include two or more light emitting members 110.

Headlamps of the vehicle 2 may not illuminate a road signboard 4 with only downward light, and thus when the high beams are operated, the light of the high beams interferes with a driver's view in a vehicle traveling in an opposite road lane, which limits the use of the headlamps, and there is a problem in that when the headlamps are carelessly used, a serious accident is caused. On the other hand, since the light irradiation unit 100 according to embodiments of the present invention applies the infrared ray or the like, which is a non-visible light beam, the infrared ray does not interfere with a driver's view even when the infrared ray is applied toward the vehicle in the opposite road lane, and thus the light irradiation unit 100 has an advantage in that it can be freely manufactured without being limited by the irradiating range.

The image capturing unit 200 is configured to capture an image (reflected light) which is retroreflected by the road signboard 4 and the road lane 6 due to light applied by the light irradiation unit 100 during traveling.

Retroreflection refers to reflection of an applied ray back to a light source, and refers to direct reflection of the light applied onto the road signboard 4 and the road lane 6 toward the light irradiation unit 100 in the vehicle without being scattered.

Retroreflective materials may be made of at least one reflective material among a glass bead, a micro prism, a fluorescent material, and the like. Of course, various other reflective materials may be used as the retroreflective materials.

Specifically, the road signboard 4 may be configured such that a background color, symbols, characters, or the like thereof is retroreflected by attaching a reflective sheet containing a reflective material thereto or by applying a paint containing a reflective material thereto. Circular glass beads are separately attached to an upper portion of the road lane 6 after the paint is applied, such that a retroreflection principle may be employed in the road lane 6 such that the road lane 6 is clearly visible.

As described above, retroreflective materials contained in the road signboard 4 and the road lane 6 enable several tens to several thousands of times or more light to be reflected such that the infrared ray applied by the light irradiation unit 100 is further amplified and reflected and reflected light of the infrared ray is captured by the image capturing unit 200.

Therefore, images of the road signboard 4 and the road lane 6, which are captured by the image capturing unit 200, are captured more clearly than those of other portions. Accordingly, since the images captured by the image capturing unit 200 are mainly captured only at the road signboard 4 and the road lane 6, the figure projection unit 300 to be described below has an effect of making the road signboard 4 and the road lane 6 clearly visible only in the driver's view by casting light of only the road signboard 4 and the road lane 6.

The image capturing unit 200 may include an infrared (IR) camera 210 which reflects the infrared ray applied from the light irradiation unit 100 and captures the reflected infrared ray.

The image capturing unit 200 is disposed inside the case 20 such that a portion of capture is directed toward the front of the case 20.

The IR camera 210 captures light which is reflected more clearly by retroreflective materials of background colors, symbols, characters of the road signboard 4, the road lane 6, and the like while the infrared ray applied from the light irradiation unit 100 is not visible to the driver in the opposite road lane.

The IR camera 210 is preferably disposed in parallel with the light emitting member 110.

The figure projection unit 300 transmits an image signal captured by the image capturing unit 20 during traveling and projects high luminance light in a state in which figures of the road signboard 4 and the road lane 6 overlap each other, such that the road signboard 4 and the road lane 6 are clearly visible.

The figure projection unit 300 receives the image signal of the IR camera 210 in which the figures of the road signboard 4 and the road lane 6 are clearly captured and applies light such that the figures of the road signboard 4 and the road lane 6 overlap each other, and thus may help with safe driving by providing an effect of the road signboard 4 and the road lane 6 emitting bright light in the driver's view. Specifically, the road signboard 4 preferably has an effect of characters, figures, symbols, and the like emitting more light than the background color.

Since the figure projection unit 300 has almost no time delay even when the vehicle 2 travels at a high speed, the light projected from the figure projection unit 300 via the image capturing unit 200 is emitted to overlap the road signboard 4 and the road lane 6 at a position at which the light irradiation unit 100 applies the light, and thus a phenomenon of the driver seeing a double image of the road signboard 4 and the road lane 6 due to a time delay does not occur.

The figure projection unit 300 may include a light emitting projector 310 which transmits and projects the image signal captured by the image capturing unit 200.

The light emitting projector 310 is provided inside the case 20 and is formed so as to irradiate a front thereof with an infrared ray.

When the vehicle 2 moves forward, left, and right and oscillates up and down, the figure projection unit 300 synchronizes movement of the road signboard 4 and the road lane 6 with a screen angle of the image capturing unit 200, traces the movement of the road signboard 4 and the road lane 6, and projects high luminance light such that the road signboard 4 and the road lane 6 overlap each other.

That is, since the light projected from the figure projection unit 300 is applied only onto the road signboard 4 and the road lane 6 during traveling the vehicle, glare to a driver of the vehicle traveling in the opposite road lane may be prevented, and a driver can be assisted with driving safely by being able to clearly recognize the road signboard and the road lane. Further, since the light applied from the light irradiation unit 100 is a non-visible light beam such as an infrared ray or the like, the light is not applied into the driver's view in the opposite road lane. Therefore, the driver in the opposite road lane may safely drive the vehicle due to the light irradiation unit 100 and the figure projection unit 300.

Meanwhile, the anti-glare type vehicle road signboard and road lane identification device may further include a figure recognition correction unit 400 configured to correct an image such that the figures of the road signboard 4 and the road lane 6 may be clearly recognized and to transmit the corrected image to the figure projection unit 300 when the figures of the road signboard 4 and the road lane 6 are blurred in the image captured by image capturing unit 200.

The figure recognition correction unit 400 is configured to correct the figures of the road lane 6 and the background color, characters, or symbols of the road signboard 4 using a figure processing technique (an image processing technique) when the road lane 6, the background color, characters, or the symbols (special characters) of the road signboard 4 and the like are worn or partially damaged due to long time use.

Therefore, even though the road lane 6 and the background color, the characters, or the symbols of the road signboard 4 are blurred or damaged, the figure recognition correction unit 400 restores or improves the figures of the road lane 6 and the background color, characters, or symbols of the road signboard 4 using a figure processing technique (an image processing technique), and thus the figure recognition correction unit 400 may enhance (correct) and provide the road lane 6 and the characters or symbols of the road signboard 4 clearly to the driver.

The light irradiation unit 100, the image capturing unit 200, and the figure projection unit 300 may be integrally provided in the case 20.

The case 20 is preferably provided at the upper portion of the front glass of the vehicle 2, as shown in FIGS. 1 and 2. Of course, the case 20 may be fixed to a support such as a roof of the vehicle or the like, and thus the light irradiation unit 100, the image capturing unit 200, and the figure projection unit 300 may be provided facing forward.

The light irradiation unit 100, the image capturing unit 200, and the figure projection unit 300 are preferably provided as close as possible to each other. The light irradiation unit 100, the image capturing unit 200, and the figure projection unit 300 are spaced apart by about 1 cm from each other. Specifically, the light irradiation unit 100 and the image capturing unit 200 may be integrally formed to be close to each other.

The anti-glare type vehicle road signboard and road lane identification device 10 according to the embodiment of the present invention may further include a data storage unit 300.

The data storage unit 500 is configured to process and control information stored so as to selectively apply light of the high luminance light applied by the figure projection unit 300 according to weather conditions and road conditions.

For example, when the data storage unit 500 is a navigation system, information stored in the navigation system according to the road conditions is retrieved, light is applied by the figure projection unit 300 being selectively controlled, and thus the ability to identify the road signboard 4 at a long distance or at a short distance may be additionally provided to the driver.

The figure projection unit 300 may communicate with at least one of general driving information, left and right turn information, side signboard information, dangerous region information, information on bad weather including mist and rain, and upward road signboard display information, which are stored in the data storage unit 500, and the figure projection unit 400 may be controlled such that all or a part of the light is selectively applied.

The information such as the general driving information, left and right turn information, side signboard information, dangerous region information, information on bad weather including mist and rain, and upward road signboard information, which are stored in the data storage unit 500, is shown as an example, and other various information may be stored and used in the data storage unit 500 as necessary.

The data storage unit 500 may be embedded in the case 20 rather than the navigation system, or may be provided and used inside or outside the vehicle.

The data storage unit 500, the light irradiation unit 100, the image capturing unit 200, the figure projection unit 300, and the figure recognition correction unit 400 may receive power through a power supply unit 600. The power supply unit 600 may be any one of a cigar jack, a vehicle battery, or be a power source on its own.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An anti-glare type vehicle road signboard and road lane identification device, the device comprising:
   a light irradiation unit provided in a vehicle and configured to irradiate an area in front of the vehicle with a non-visible light beam;
   an image capturing unit configured to capture an image which is retroreflected by the road signboard and the road lane located in the area in front of the vehicle, due to light applied by the light irradiation unit; and
   a figure projection unit configured to transmit an image signal captured by the image capturing unit and project high luminance light in a state in which figures of the road signboard and the road lane overlap the road signboard and the road lane, respectively, such that the road signboard and the road lane are clearly visible;
   wherein the light irradiation unit, the image capturing unit, and the figure projection unit are provided together at an upper portion of a front glass windshield of the vehicle, such that the light irradiation unit, the image capturing unit, and the figure projection unit are disposed in parallel with each other and share a same field of view angle.

2. The device of claim 1, wherein the light irradiation unit includes a light emitting member configured to apply at least one of an infrared ray, ultraviolet ray, and X-ray which is not to be seen by a driver of an oncoming vehicle.

3. The device of claim 1, wherein the image capturing unit includes an infrared camera configured to capture a reflected infrared ray applied from the light irradiation unit to the road signboard and road lane.

4. The device of claim 1, wherein the figure projection unit includes a light emitting projector configured to project the image signal captured by the image capturing unit.

5. The device of claim 1, wherein when the vehicle moves forward, left, and right and oscillates up and down, the figure projection unit synchronizes a change in position of the road signboard and the road lane with respect to the image capturing unit, traces the road signboard and the road lane, and projects high luminance light such that the road signboard and the road lane overlap each other.

6. The device of claim 1, further comprising a figure recognition correction unit configured to correct an image such that the figures of the road signboard and the road lane may be clearly recognized and to transmit the corrected image to the figure projection unit when the figures of the road signboard and the road lane are blurred in the image captured by image capturing unit.

\* \* \* \* \*